April 16, 1946.   F. S. BEACH ET AL   2,398,352
CONSUMPTION RECORDER ATTACHMENT FOR METERS
Filed July 20, 1943   3 Sheets-Sheet 1
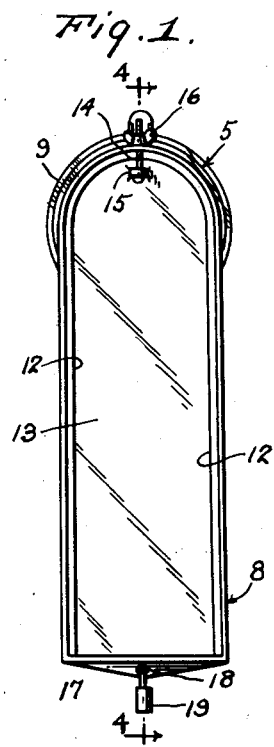
Fig. 1.
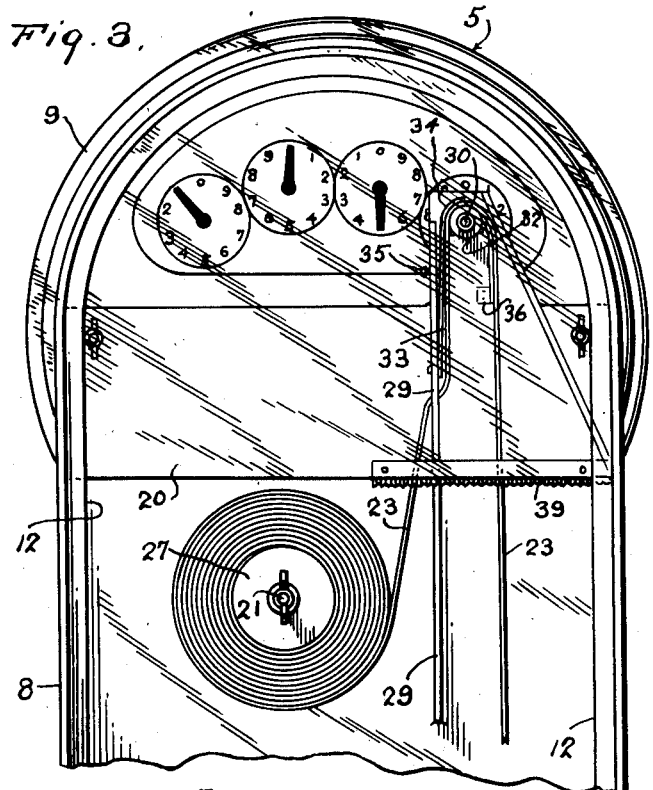
Fig. 3.
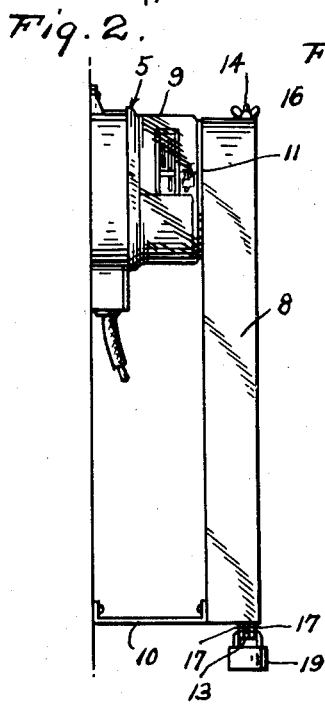
Fig. 2.
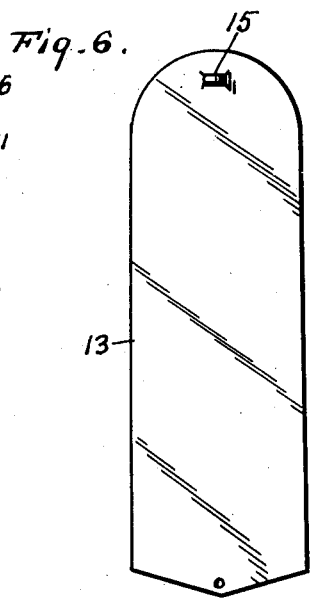
Fig. 6.
Fig. 7.
Inventors
Fred S. Beach
Rose B. Beach &
By Clarence A. O'Brien
and Harvey B. Jacobson
Attorneys

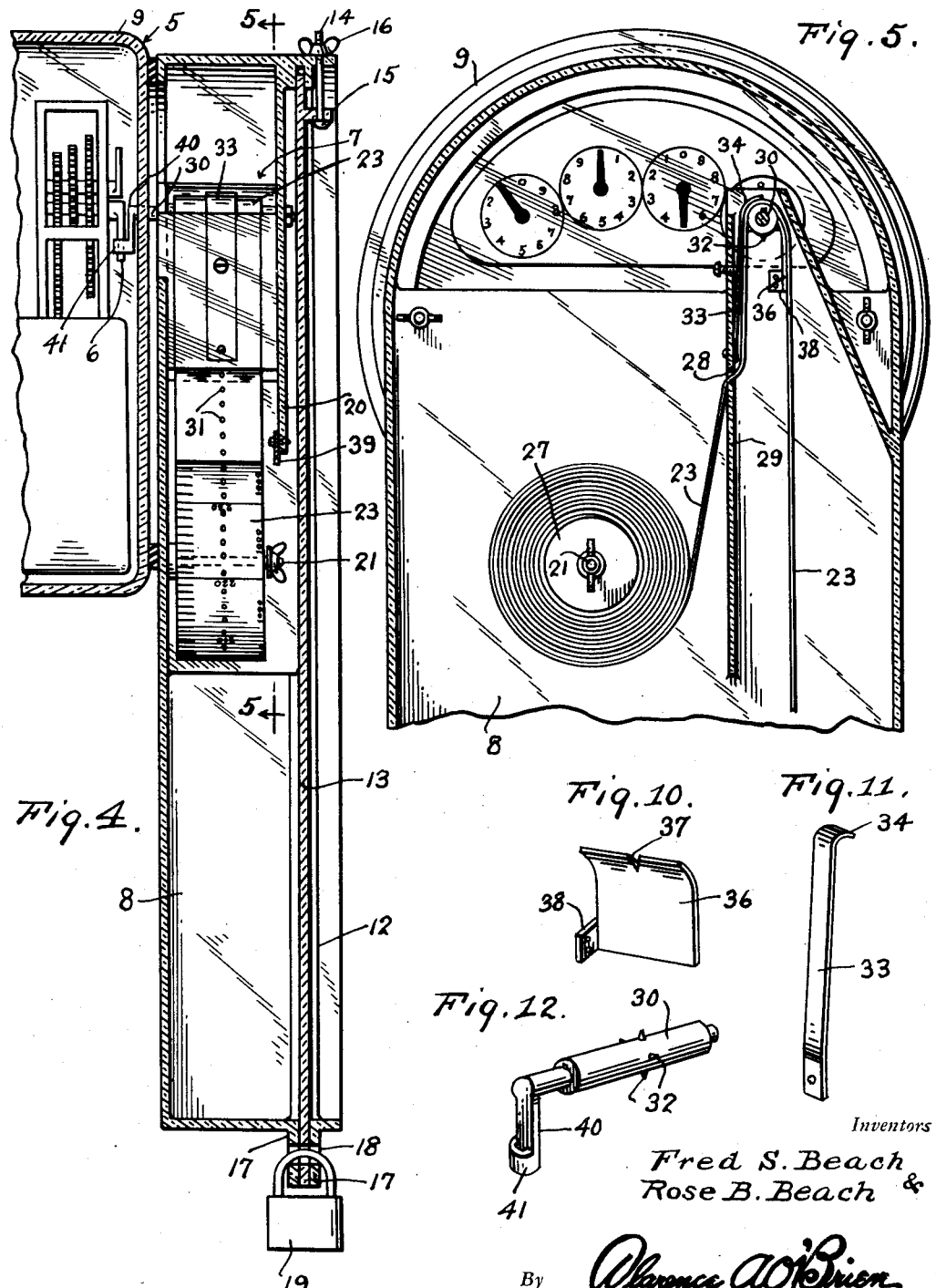

April 16, 1946.  F. S. BEACH ET AL  2,398,352
CONSUMPTION RECORDER ATTACHMENT FOR METERS
Filed July 20, 1943  3 Sheets-Sheet 3
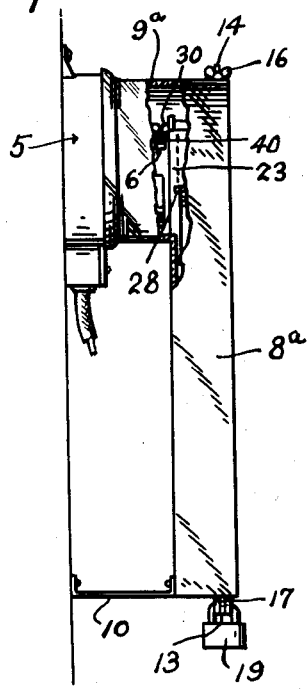
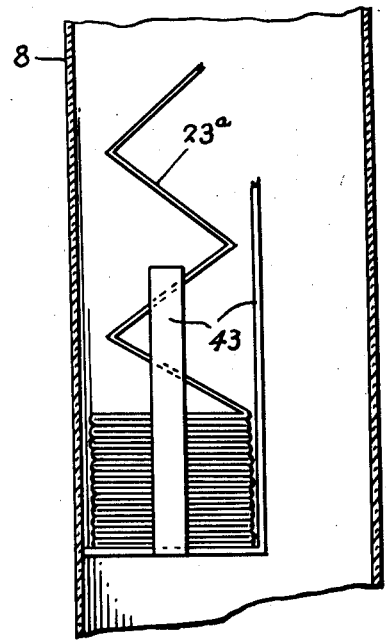
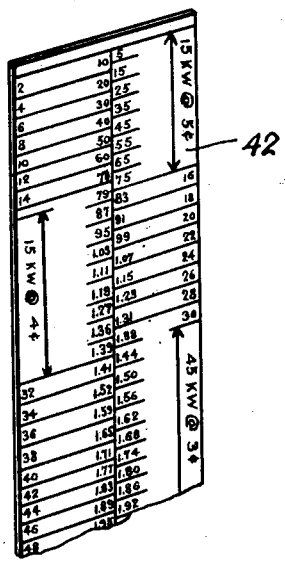
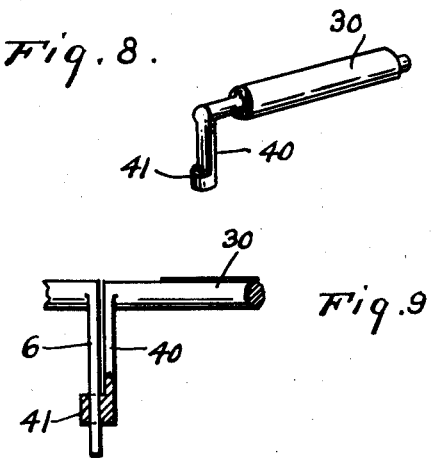
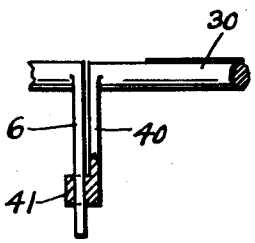
Inventors,
Fred S. Beach
Rose Beach &
By Clarence A. O'Brien
and Harvey B. Jacobson
Attorneys Patented Apr. 16, 1946

2,398,352

UNITED STATES PATENT OFFICE 2,398,352

CONSUMPTION RECORDER ATTACHMENT FOR METERS

Fred S. Beach and Rose B. Beach, Charlotte, Mich.

Application July 20, 1943, Serial No. 495,464

2 Claims. (Cl. 234—58)

The present invention relates to new and useful improvements in meters and more particularly to means for use in conjunction with electric, gas and other meters for recording the amount of consumption as it is registered.

An important object of the invention is to provide a device which may form an integral part of a newly constructed meter or be in the form of an attachment which can be readily attached to a meter and actuated by the registering mechanism thereof.

Another important object of the invention is to provide a device of the character stated which is adapted to be actuated by a meter mechanism for feeding a consumption indicating strip and wherein periodically, the strip can be torn off and measured against a price chart to determine what amount to be sent to the particular public utility concern.

Still another object of importance is to provide a device of the character stated which because of its simplicity of construction can be manufactured at a nominal cost and which because of the accessibility of its parts can be readily repaired.

Various other important objects and advantages of the invention will become apparent to the reader of the following description.

In the drawings—

Figure 1 is a front elevational view of the attachment.

Figure 2 is a side elevational view of the structure shown in Figure 1.

Figure 3 is a fragmentary front elevational view with the cover removed.

Figure 4 is a fragmentary vertical sectional view taken on the line 4—4 of Figure 1.

Figure 5 is a fragmentary vertical sectional view taken on the line 5—5 of Figure 4.

Figure 6 is a front elevational view of the slide cover.

Figure 7 is a fragmentary vertical sectional view through the operating roll of the attachment.

Figure 8 is a perspective view of the operating roll.

Figure 9 is a fragmentary detailed sectional view showing how the operating roll is connected with the indicating hand of the meter.

Figure 10 is a perspective view of the tape peeling element.

Figure 11 is a perspective view of the tape holding spring.

Figure 12 is a perspective view of a slightly modified form of roll showing feed teeth.

Figure 13 is a perspective view of the price chart used in conjunction with the recorder.

Figure 14 is a fragmentary side elevational view showing the present invention built into a new meter.

Figure 15 is a fragmentary detailed sectional view showing the record strip moving from an accordion formed pile.

Referring to the drawings wherein like numerals designate like parts, it can be seen that numeral 5 generally refers to a registering meter, say for instance, an electric meter having its lowest amount indicating hand 6 connected with the present invention, which is generally referred to by numeral 7.

As is evident from the drawings, the present invention can be in the form of an attachment as shown in Figure 2, or built into the meter as suggested in Figure 14.

Taking first, the device which is an attachment, it can be seen that numeral 8 denotes a vertically elongated box preferably of plastic material and which at its upper portion is opposed to the usual bowl 9 of the companion meter 5. A suitable bracket 10 supports the box 8 and a resilient gasket 11 which is preferably weatherproof, separates the upper portion of the box 8 from the meter bowl.

As is seen in Figure 4, the inside of the side walls of the box 8 are provided with guideways 12 for receiving the edge portions of a cover 13 which is preferably of plastic material. It is also preferable that the guideways 12 taper slightly in an upward direction as does the edge portion of the cover 13 so that when the cover is moved to its uppermost position and held by a bolt 14, the box will be entirely weather-proof in all respects.

The bolt 14 passes through a lug 15 and through an opening in the top of the box where the said bolt is equipped with a wing nut 16.

The lower portion of the cover 13 passes downwardly through a slotted lip 17 having an opening 18 therethrough and through which a padlock 19 can be disposed.

In the upper portion of the box 8 is a short vertical partition 20. Just below the lower portion of the partition 20 is a spindle 21 on which a roll 27 is rotatable and this roll 27 has tape 23 wound thereon. The tape 23 passes upwardly and through an opening 28 in a vertical member 29 and extends farther upwardly and over a roll 30. In this connection the record tape 23 may have a center line of perforations 31 for receiving the feed teeth 32 on the roll 30.

Obviously, it is not necessary to have the feed teeth 32 for the record tape 23 as the tape will be smoothly and accurately fed simply with the provision of a spring finger 33, this finger being secured to one side of the vertical member 29 and having its upper end curved as at 34 for disposition over the tape 23 and roll 30. It can be seen that an adjusting screw 35 is provided for holding the finger and record tape 23 against the roll 30.

Numeral 36 denotes a short plate having a fairly sharp edge for peeling the record tape from the roll 30. The upper edge of this peeler 36 is notched as at 37 to avoid the teeth 32 on the roll 30 and has an attaching lug 38.

Just under the roll 30, the lower edge of the partition 20 has a serrated blade 39 on which the record tape can be cut.

As can be seen in Figures 8 and 9, the roll 30 may be smooth, or it may be provided with teeth 32 as shown in Figure 12. This roll has an arm 40 at one end and this arm has an apertured head 41 through which the meter hand 6 is disposed. Obviously, as this hand 6 rotates, the shaft 30 is concurrently rotated for feeding the record tape 23.

Obviously, the strip 23 will be marked off in certain designations indicating amounts consumed and indicated by the meter, and after the tape has been torn off by engaging the same against the blade 39, it can be matched with the price chart 42 so that the consumer can ascertain the amount of electricity or gas which he has consumed over the past period, to the end, that he may make a proper remittance to the corresponding public utility concern.

The strip is matched against a chart 42, which, of course, for different kinds of service and changes in prices will vary from time to time.

The indicating strip 23 may come from a roll 27, or a strip 23a may be employed and this folded back and forth in the form of a pile resting within a cage 43 as is clearly shown in Figure 15.

Figure 2 of the drawings shows the present invention as an attachment, however, the box 9a (see Figure 14) has a rearwardly disposed cylindrical portion 9a which takes the place of the conventional meter bowl 8. Further, there are various other ways in which the present invention can be built in to a new meter.

While foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, an automatic registering meter having a bowl, a vertically elongated box on the front of and depending below the bowl, said box having a lockable front closure, a record tape feed roll journaled in the upper portion of the box, means providing a constant operative connection between one end of said feed roll and an indicating hand of the meter, a support for a supply of record tape mounted in the upper portion of the box below and to one side of said feed roll, means for directing the record tape upwardly over and pressing it into intimate contact with the feed roll, and means for peeling the record tape from the feed roll after passing over the latter, so as to cause the tape to depend and pass from the feed roll to the lower portion of the box, and a fixed blade mounted in the box adjacent the depending portion of the tape to facilitate severing of the tape at a predetermined point below the feed roll by tearing the tape off against said blade.

2. An attachment for an automatic registering meter having a bowl, comprising a vertically elongated box having a lockable front closure, means to secure the upper portion of the box to the front of the meter bowl, a record tape feed roll journaled in the upper portion of the box, means to provide a constant operative connection between one end of said feed roll and an indicating hand of the meter, a support for a supply of record tape mounted in the upper portion of the casing below and to one side of said feed roll, means for directing the record tape over and pressing it into intimate contact with the feed roll, means for peeling the record tape from the feed roll after passing over the latter so as to cause the tape to depend and pass from the feed roll to the lower portion of the box, and a fixed blade mounted in the box adjacent the depending portion of the tape to facilitate severing of the tape at a predetermined point below the feed roll by tearing the tape off against said blade.

FRED S. BEACH.
ROSE B. BEACH.